(12) United States Patent
Matsumura (10) Patent No.: US 7,931,318 B2
(45) Date of Patent: Apr. 26, 2011

(54) BUMPER ATTACHMENT PORTION STRUCTURE

(75) Inventor: Katsuya Matsumura, Nagoya (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 248 days.

(21) Appl. No.: 12/207,563

(22) Filed: Sep. 10, 2008

(65) Prior Publication Data

US 2009/0079210 A1    Mar. 26, 2009

(30) Foreign Application Priority Data

Sep. 21, 2007 (JP) ................. 2007-244972

(51) Int. Cl.
  *B60R 19/24* (2006.01)
(52) U.S. Cl. ....................... 293/133; 293/155
(58) Field of Classification Search .............. 293/131, 293/133, 132, 155, 154; 296/187.1, 187.11, 296/187.09, 203.02, 203.04
See application file for complete search history.

(56) References Cited

U.S. PATENT DOCUMENTS

| 5,080,412 | A * | 1/1992 | Stewart et al. | 293/155 |
| 6,174,009 | B1 * | 1/2001 | McKeon | 293/133 |
| 7,201,414 | B2 * | 4/2007 | Iketo et al. | 293/133 |
| 7,543,866 | B2 * | 6/2009 | Arns | 293/133 |

FOREIGN PATENT DOCUMENTS

| JP | U 02-083147 | 6/1990 |
| JP | U 06-027439 | 4/1994 |
| JP | 2003-306095 | 10/2003 |
| JP | 2005-119358 | 5/2005 |
| JP | 2006-315575 | 11/2006 |

OTHER PUBLICATIONS

Notice of Reasons for Rejection for Japanese Patent Appl. No. 2007-244972, mailing date Feb. 23, 2010.

* cited by examiner

*Primary Examiner* — Glenn Dayoan
*Assistant Examiner* — Melissa A Black
(74) *Attorney, Agent, or Firm* — Finnegan, Henderson, Farabow, Garrett & Dunner, LLP (57) ABSTRACT

The present invention provides a bumper attachment portion structure that can ensure the deformation stroke of a side member when a vehicle impacts such that the vehicle is offset to one side in a vehicle width direction of a bumper. When a load that is equal to or greater than a predetermined value is inputted to a bumper attachment portion during an offset impact, an attachment releasing structure portion in a bumper bracket releases the state of attachment at a vehicle width direction inside part of that bumper attachment portion to thereby cause a point of origin of bending in the bumper attachment portion to be positioned in a vehicle width direction outside part.

7 Claims, 7 Drawing Sheets

BUMPER ATTACHMENT PORTION STRUCTURE

CROSS-REFERENCE TO RELATED APPLICATION

This application claims priority under 35 USC 119 from Japanese Patent Application No. 2007-244972, the disclosure of which is incorporated by reference herein.

BACKGROUND

1. Technical Field

The present invention relates to a bumper attachment portion structure that is applied to a vehicle body structure that is configured to include a bumper reinforcement and side members.

2. Related Art

In the front portion or the rear portion of a vehicle, there is a structure where a bumper reinforcement is attached via brackets to distal end portions of side members. In this structure, as described in Japanese Patent Application Laid-open (JP-A) No. 2006-315575, for example, the distal end portions of the side members and the brackets are disposed with flange portions that extend toward both sides in the vehicle width direction, and these flange portions are fixed to each other. In such a structure, in a case where the vehicle impacts such that the vehicle is offset in the vehicle width direction of the bumper and receives a reaction force in one of the side members, when a bending moment acts on that side member, there are cases where the side member ends up bending using the attachment portion where the side member is attached to the bracket as an origin. In this case, the intermediate bending point of the side member that has become bent outward in the vehicle width direction cannot move to the side of the bumper reinforcement, and when that intermediate bending point ends up interfering with the bumper reinforcement, the deformation stroke of the side member ends up becoming small depending on the rigidity of the bumper reinforcement.

SUMMARY OF THE INVENTION

In consideration of the above-described circumstance, the present invention obtains a bumper attachment portion structure that can ensure the deformation stroke of a side member when a vehicle impacts at a position that is offset in a vehicle width direction of the bumper.

A bumper attachment portion structure of a first aspect of the present invention is applied to a vehicle body structure and comprises a bumper reinforcement, a pair of right and left side members, and attachment releasing parts. The bumper reinforcement is disposed on an end portion side in a front-rear direction of a vehicle, extends substantially along a vehicle width direction while convexly curving frontward or rearward in the vehicle front-rear direction and receives an impact load during an impact. The pair of right and left side members extend substantially parallel to each other along the vehicle front-rear direction and have attached thereto, directly or via other members, both longitudinal direction end portion sides of the bumper reinforcement. Each of the attachment releasing parts is disposed at a bumper attachment portion where the bumper reinforcement and the side member are connected each other, and when a load that is equal to or greater than a predetermined value is inputted to the bumper attachment portion during an impact, the attachment releasing part releases the state of attachment at a vehicle width direction inside part of the bumper attachment portion to thereby causes a point of origin of bending in the bumper attachment portion to be positioned in a vehicle width direction outside part of the bumper attachment portion.

According to the first aspect of the bumper attachment portion structure, both longitudinal direction end portion sides of the bumper reinforcement are attached to the pair of right and left side members directly or via other members, and the side members extend substantially parallel to each other along the vehicle front-rear direction. In a case of an "offset collision" that is, a vehicle impacts at a position which is offset to one side in the vehicle width direction of the bumper (a case where the vehicle does not impact along all of the vehicle front/back side of the bumper but impacts at one side position in the vehicle width direction of the bumper; the same is applied hereinbelow), an impact load is inputted to the bumper reinforcement and is propagated from the bumper reinforcement side to the side member side. Further, since the bumper reinforcement extends substantially along the vehicle width direction while convexly curving frontward or rearward in the vehicle front-rear direction, in case of the offset collision, the bumper reinforcement deforms so as to become a straight line whose longitudinal direction is the vehicle width direction. Accordingly, a bending moment that bends the side members outward in the vehicle width direction is generated. Because of the bending moment, the bumper brackets move outward in the vehicle width direction together with the side members.

Note that, when a load that is equal to or greater than a predetermined value is inputted to the bumper attachment portions during an impact, the attachment releasing part that is disposed in the bumper attachment portion releases the state of attachment at the vehicle width direction inside part of the bumper attachment portion. In a case of the offset collision, when the side member is bent outward in the vehicle width direction by the bending moment acting on the side member and a load that is equal to or greater than a predetermined value is inputted to the bumper attachment portion, in accompaniment with this, the state of attachment at the vehicle width direction inside part of the bumper attachment portion is released by the attachment releasing part, and the vehicle width direction outside part of the bumper attachment portion becomes the point of origin of bending and bend. Thus, the movement locus of the intermediate bending point of the side member that has become bent outward in the vehicle width direction becomes provided further outward in comparison to a structure where there is no attachment releasing part. Accordingly, the intermediate bending point of the side member advances as far as the side of the bumper reinforcement.

That is, according to this aspect, the bumper attachment portion structure has the excellent effect that, when the offset collision takes place, a deformation stroke of the side member can be ensured.

In a second aspect of the present invention, in the configuration of the first aspect, the bumper attachment portion structure may further comprise bumper brackets that are respectively provided in the bumper attachment portions between an end portion of the side member on the bumper reinforcement side and the bumper reinforcement and couple the end portions of the side members and the bumper reinforcement together. Each of the bumper brackets is provided with an inside flange portion and an outside flange portion that extend further inward and outward respectively in the vehicle width direction than an attachment position where the bumper bracket is attached to the side member, and is attached to the bumper reinforcement by the inside and outside flange portions. Each of the attachment releasing parts is disposed at the inside flange portion and, when a load that is equal to or greater than a predetermined value is inputted to the bumper attachment portion during the impact, uses an outside flange portion side of the bumper attachment portion as a point of origin of bending.

According to this bumper attachment portion structure, the bumper bracket that couples the side member and the bumper reinforcement is provided with the flange portions that extend toward both sides in the vehicle width direction and is attached to the bumper reinforcement. Since the attachment releasing parts is provided in the inside flange portion, when a load that is equal to or greater than a predetermined value is inputted to the bumper attachment portion in case of the offset collision, the attachment at the inside flange portion is released and the bumper attachment portion bends using the outside flange portion as the point of origin of bending.

That is, according to this aspect, the bumper attachment portion structure has the excellent effect that the side member side can be bent with the outside flange portion side that is attached to the bumper reinforcement.

In a third aspect of the invention, in the second aspect, the bumper attachment portion structure may further comprises fastening parts that cause fastening load to act on the bumper reinforcement and the inside and outside flange portions, and each of the attachment releasing parts configures an attachment releasing structure portion where a notch portion that opens inward in the vehicle width direction is formed in the inside flange portion, and a portion of the fastening part penetrates the notch portion.

According to this bumper attachment portion structure, the attachment releasing part is configured as the attachment releasing structure portion where the notch portion that opens inward in the vehicle width direction is formed in the inside flange portions and a portion of the fastening part penetrates the notch portions therefore, when a load that is equal to or greater than a predetermined value is inputted to the bumper attachment portion in case of the offset collision, the fastening part escapes from the open side of the notch portion in the inside flange portions, whereby the attachment at the inside flange portion is released, and the bumper attachment portion bends using the outside flange portion side as the point of origin of bending.

That is, according to this aspect, the bumper attachment portion structure has the excellent effect that the fastening part can be stably removed from the inside flange portion side.

In a forth aspect of the invention, in the second aspect, the bumper attachment portion structure may further comprise fastening parts that cause fastening load to act on the bumper reinforcement and the inside and outside flange portions, and each of the attachment releasing parts includes a low attachment strength structure portion where the attachment strength with which the inside flange portion is attached to the bumper reinforcement by the fastening part is set to be lower in comparison to the attachment strength with which the outside flange portion is attached to the bumper reinforcement.

According to this bumper attachment portion structure, the attachment releasing part includes the low attachment strength structure portion where the attachment strength with which the inside flange portion is attached to the bumper reinforcement by the fastening means is set to be lower in comparison to the attachment strength with which the outside flange portion is attached to the bumper reinforcement. Accordingly, when a load that is equal to or greater than a predetermined value is inputted to the bumper attachment portions in case of the offset collision, the attachment resulting from the fastening part is released at the inside flange portion and the bumper attachment portion bends using the outside flange portion sides as the point of origin of bending.

That is, according to this aspect, the bumper attachment portion structure has the excellent effect that the attachment of the inside flange portion side can be released with a simple configuration.

In a fifth aspect of the invention, in the second aspect, each of the bumper brackets is provided with an extension portion that extends on at least one side of a top surface side or a bottom surface side of the bumper reinforcement, and a deformation promoting portion is formed in the extension portion in a vicinity position of the point of origin of bending. The vicinity position coincides in the vehicle width direction with the part of the outside flange portion side that becomes the point of origin of bending, and when a load that is equal to or greater than a predetermined value is inputted to the bumper attachment portions during the impact, the deformation promoting portion causes a part of the bumper attachment portions that is positioned further inward in the vehicle width direction than the vicinity position of the point of origin of bending to bend frontward or rearward in the vehicle front-rear direction (in a direction of a vehicle cabin).

According to this bumper attachment portion structure, the deformation promoting portion is formed in the extension portion that extends on at least one side of the top surface side or the bottom surface side of the bumper reinforcement in the brackets. When a load that is equal to or greater than a predetermined value is inputted to the bumper attachment portion during an impact, a part of the extension portion that becomes further inward in the vehicle width direction than the vicinity position of the point of origin of bending bends frontward or rearward in the vehicle front-rear direction (in the direction of the cabin). The bumper bracket stably bends with a large bending angle using the outside flange portion side as the point of origin of bending.

That is, according to this aspect, the bumper attachment portion structure has the excellent effect that, in case of the offset collision, the bumper bracket and therefore the side member can be stably bent with a large bending angle using the outside flange portion side as the point of origin of bending.

In a sixth aspect of the invention, in the configuration of the second aspect, the bumper attachment portion structure further comprises bumper brackets that are respectively provided between an end portion of the side member on the bumper reinforcement side and the bumper reinforcement and couple together the end portions of the side members and the bumper reinforcement. Each of the attachment releasing part is disposed in the side member and the bumper bracket and, when a load that is equal to or greater than a predetermined value is inputted to the bumper attachment portions during the impact, uses vehicle width direction outside parts of the side member and the bumper bracket as the points of origin of bending.

According to this aspect, the bumper attachment portion structure is provided with the bumper bracket that couples together the side member and the bumper reinforcement, and the attachment releasing part is disposed in the side member and the bumper bracket. When a load that is equal to or greater than a predetermined value is inputted to the bumper attachment portions in case of the offset collision, the bumper attachment portion bends while using the vehicle width direction outside parts of the side member and the bumper brackets as the points of origin of bending because of the attachment releasing part.

That is, according to this aspect, the bumper attachment portion structure has the excellent effect that the deformation stroke of the side member can be ensured.

In a seventh aspect of the invention, in the sixth aspect, the bumper attachment portion structure further comprises fastening parts that cause a fastening load to act on the side members and the bumper brackets. Each of the attachment releasing parts configures as a low attachment strength portion where the attachment strength resulting from the fastening parts with respect to the side members and the bumper brackets is set to be lower in a vehicle width direction inside part than in a vehicle width direction outside part.

According to this bumper attachment portion structure, the attachment releasing part is configured as the low attachment strength portion where the attachment strength resulting from the fastening parts with respect to the side member and the bumper bracket is set to be lower in the vehicle width direction inside part than in the vehicle width direction outside part. Accordingly, when a load that is equal to or greater than a predetermined value is inputted to the bumper attachment portions in case of the offset collision, the attachment resulting from the fastening part is released at the vehicle width direction inside part and the bumper attachment portion bends while using the vehicle width direction outside part as the point of origin of bending.

That is, according to the above aspect, the bumper attachment portion structure has the excellent effect that, in case of the offset collision, the attachment resulting from the fastening part can be released at the vehicle width direction inside part of the bumper attachment portion with a simple configuration.

BRIEF DESCRIPTION OF THE DRAWINGS

Exemplary embodiments of the present invention will be described in detail based on the following figures, wherein.

DETAILED DESCRIPTION

Herebelow, examples of exemplary embodiments of the present invention will be described in detail with reference to the drawings.

First Exemplary Embodiment

A bumper attachment portion structure 12 pertaining to a first exemplary embodiment of the present invention will be described using FIG. 1 to FIG. 3C. It will be noted that appropriately shown in these drawings are arrow FR, which represents a vehicle front side, arrow UP, which represents a vehicle upper side, and arrow IN, which represents a vehicle width direction inside.

Figure 1:
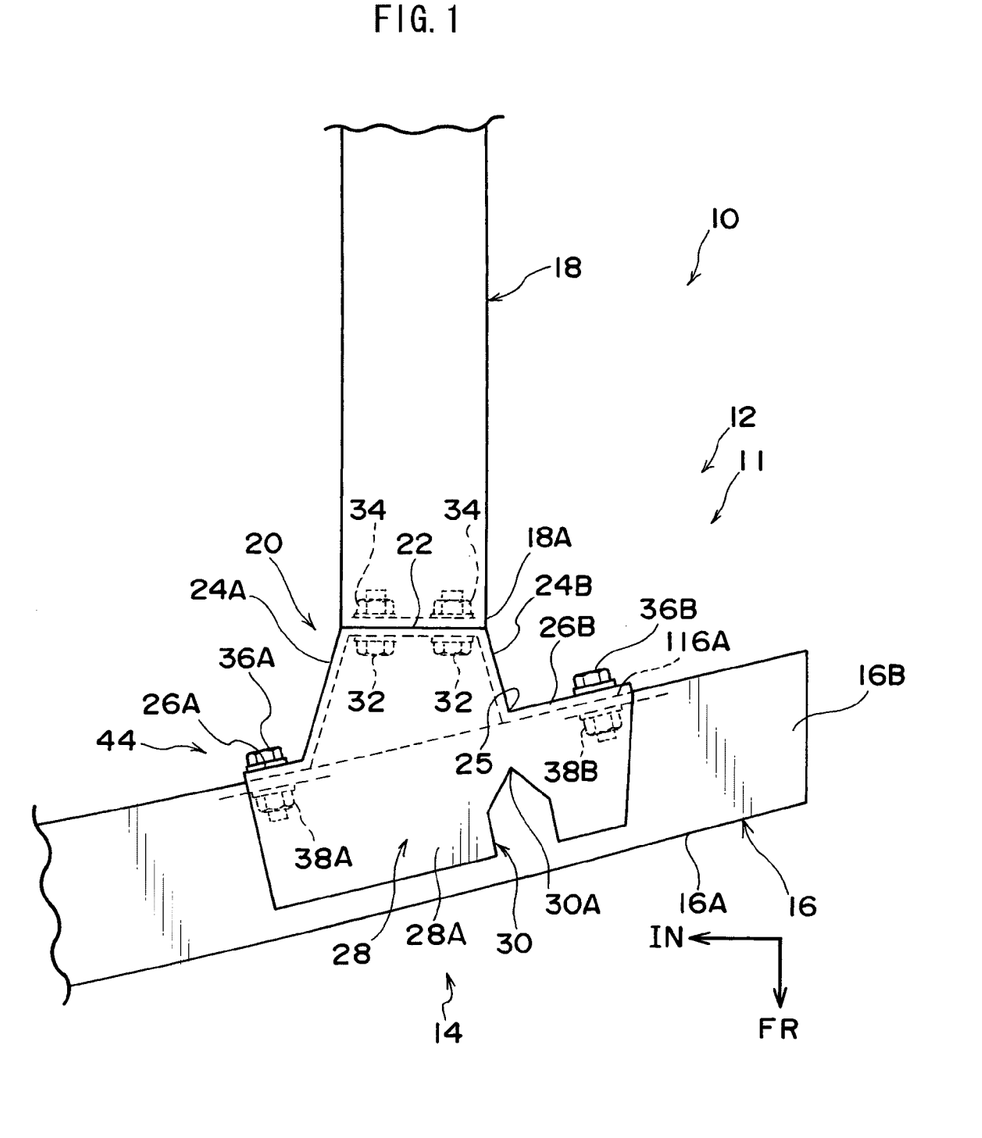
FIG. 1 is a plan diagram showing relevant portions of a bumper attachment portion structure pertaining to a first exemplary embodiment of the present invention.

In FIG. 1, there is shown a plan diagram of a vehicle body front portion structure 10 that serves as a vehicle body structure to which the bumper attachment portion structure 12 pertaining to the present exemplary embodiment is applied. It will be noted that, in FIG. 1, just one side in a vehicle width direction is shown. As shown in FIG. 1, a front bumper reinforcement 16 that configures part of a front bumper 14 is disposed on a front end portion side in a front-rear direction of a vehicle. The front bumper reinforcement 16 extends along the vehicle width direction while convexly (arcing) curving toward the vehicle front side (see FIG. 2A, FIG. 2B and FIG. 2C), and the cross-sectional shape of the front bumper reinforcement 16 is a closed cross-sectional configuration. Further, the front bumper reinforcement 16 is configured as a high-strength and high-rigidity vehicle body frame member and serves as a member that receives an impact load F (see FIG. 2A, FIG. 2B and FIG. 2C) during an impact from the vehicle front side. It will be noted that the front bumper 14 is configured by elements such as the front bumper reinforcement 16, an unillustrated front bumper absorber that comprises urethane foam and is disposed along the front bumper reinforcement 16 on the front surface side thereof, and an unillustrated front bumper cover that extends along the front bumper absorber on the front surface side thereof and configures a design surface.

Figure 2A:
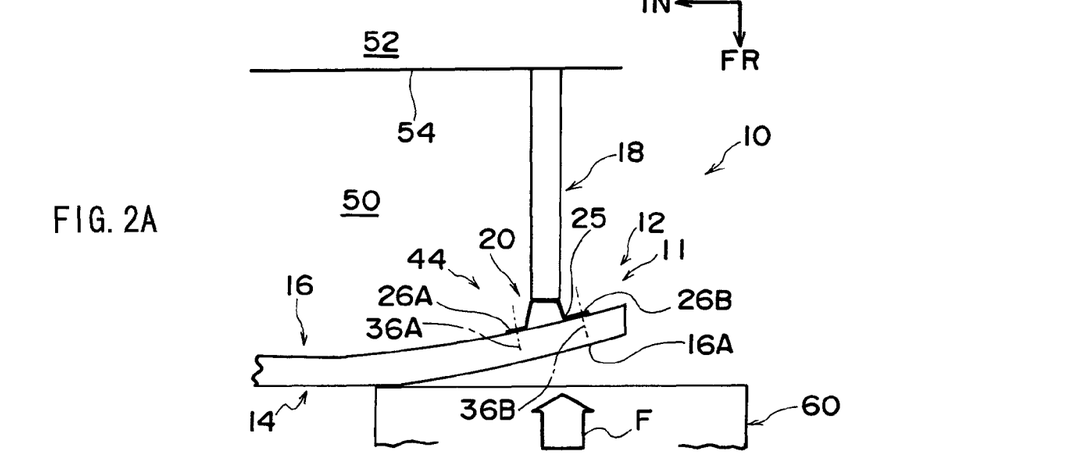
FIG. 2A, FIG. 2B and FIG. 2C are state change diagrams schematically showing deformation at a vehicle body front portion during an offset collision.

Front side members 18 are disposed on the vehicle rear side of the vicinities of both longitudinal direction end portions 16A of the front bumper reinforcement 16, that is, on both sides in the vehicle width direction of the vehicle body front portion structure 10. The pair of right and left front side members 18 are elongate members that are configured in closed cross-sectional configurations and extend substantially parallel to each other along the vehicle front-rear direction. As shown in FIG. 2A, the rear portion side of the front side member 18 is joined to a dash panel 54 that partitions an engine room 50 and a cabin 52.

Bumper brackets 20 are intervened between respective front end portions 18A (end portions on the front bumper reinforcement 16 side) of the front side members 18 and both longitudinal direction end portions 16A of the front bumper reinforcement 16. The bumper bracket 20 is fixed to and couples together the front end portion 18A of the front side member 18 (see FIG. 1) and longitudinal direction end portion 16A of the front bumper reinforcement 16. In other words, both longitudinal direction end portion 16A sides of the front bumper reinforcement 16 are attached to the pair of right and left front side members 18 via the bumper brackets 20.

The bumper bracket 20 shown in FIG. 1 has a substantial hat-like shape that opens to the vehicle front side when seen in a horizontal cross-sectional view, and a rear end attachment portion 22 that is disposed on the vehicle rear side of the bumper bracket 20 is fixed to the front end portion 18A of the front side member 18 via bolts 32 and nuts 34. A pair of right and left vertical wall portions 24A and 24B (reference numeral 24A represents the vertical wall portion on the vehicle width direction inside and reference numeral 24B represents the vertical wall portion on the vehicle width direction outside) that are bent at an angle-of-inclination that is somewhat larger than a right angle toward the substantial vehicle front side and are shaped so as to widen toward the vehicle front side are formed on both vehicle width direction ends of the rear end attachment portion 22.

A pair of right and left flange portions 26A and 26B that are bent in mutually opposite directions are formed on vehicle front side end portions of the vertical wall portions 24A and 24B. The flange portion 26A extends further inward in the vehicle width direction and the flange portion 26B extends further outward in the vehicle width direction than an attachment position respectively where the rear end attachment portion 22 is attached to the front end portion 18A of the front side member 18.

The inside flange portion 26A and the outside flange portion 26B are superposed on a rear end surface 116A of both longitudinal direction end portions 16A of the front bumper reinforcement 16 that faces the vehicle rear side. In this state, bolts 36A and nuts 38A that serve as a fastening part causes a fastening load to act on the front bumper reinforcement 16 and the inside flange portion 26A. Further, bolts 36B and nuts 38B that serve as a fastening part causes a fastening load to act on the front bumper reinforcement 16 and the outside flange portion 26B. Because of these fastening parts, the inside flange portion 26A and the outside flange portion 26B are attached to the respective end portions 16A of the front bumper reinforcement 16. It will be noted that the bolts 36A and 36B are elements that are to be broadly understood as male screw members and that the nuts 38A and 38B are elements that are to be broadly understood as female screw members.

Figure 3A:
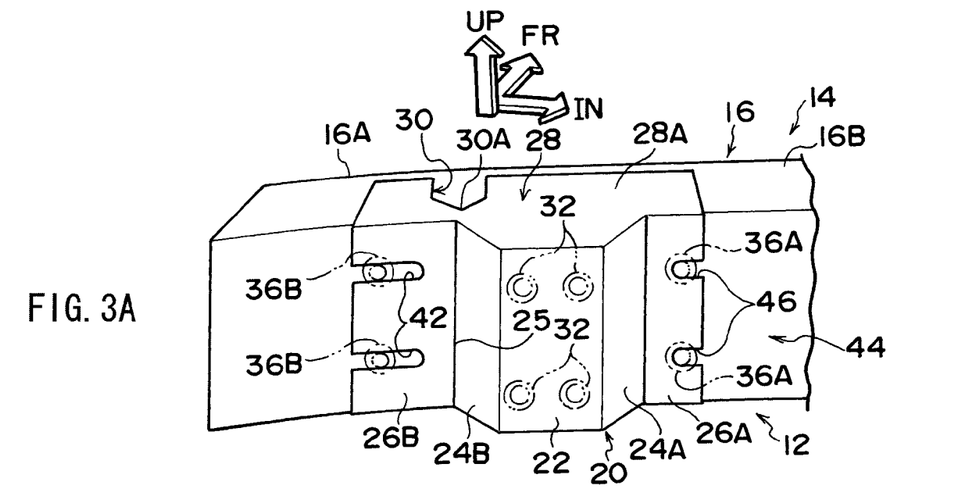
FIG. 3A, FIG. 3B and FIG. 3C are state change diagrams showing displacement and deformation of a bumper bracket during an offset collision.
Figure 3B:
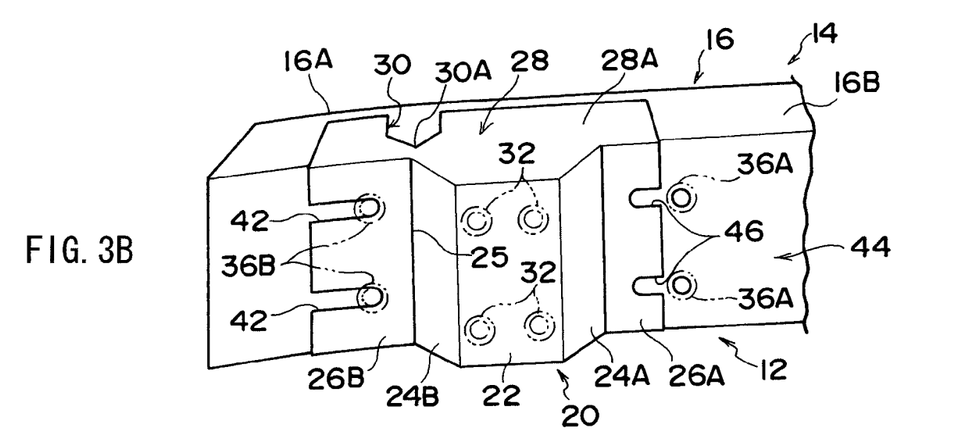
Figure 3C:
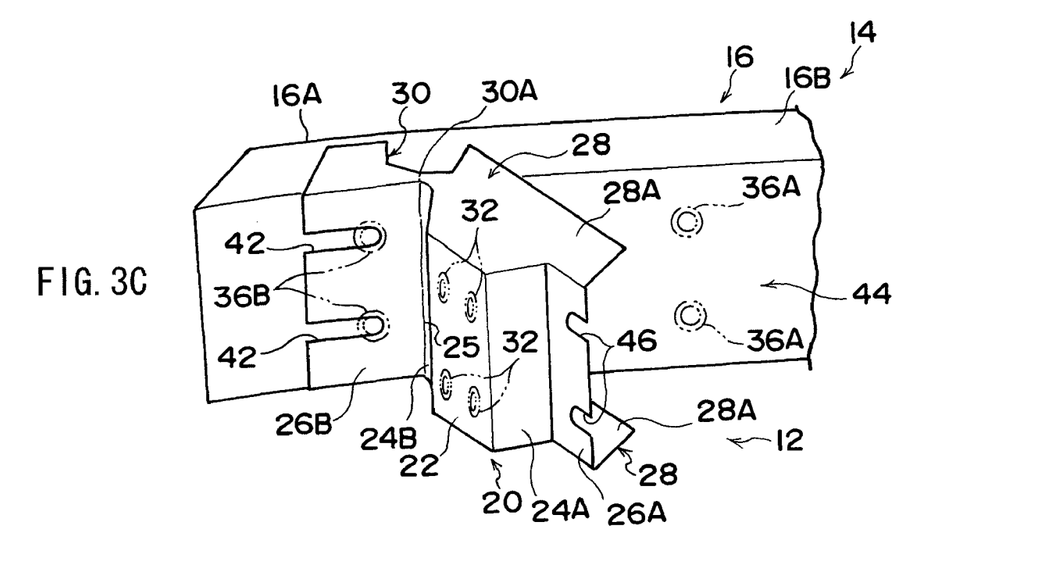

In the present exemplary embodiment, the length of the outside flange portion 26B in a direction along the longitudinal direction of the front bumper reinforcement 16 is set to be longer in comparison to the length of the inside flange portion 26A. FIGS. 3A through 3C show a state where the outside flange portion 26B is seen from the substantial vehicle rear side. In a fastening structure of the bumper bracket 20, slits portions 42 that extend along the longitudinal direction of the front bumper reinforcement 16 and open outward in the vehicle width direction are formed in a total of two places above and below in a vehicle vertical direction intermediate portion of the outside flange portion 26B. The bolts 36B penetrate portions of the slit portions 42, whose inner peripheral end edges are U-shaped. The portions where the bolts 36B penetrate the slit portions 42 are positioned near the vehicle width direction outsides of the slit portions 42. Thus, the outside flange portion 26B can slide outward in the substantial vehicle width direction by a stroke that substantially corresponds to the length of the slit portions 42. It will be noted that the length of the slit portions 42 and the position of the bolts 36B with respect to the slit portions 42 are set such that the bumper bracket 20 does not come off during deformation of the front bumper reinforcement 16.

An attachment releasing structure portion 44 that serves as an attachment releasing part is disposed in the inside flange portion 26A. The attachment releasing structure portion 44 is configured as a structure where notch portions 46 that open inward in the vehicle width direction are formed in the inside flange portion 26A and where the bolts 36A (bolt shaft portions) that configure part of the fastening means penetrate the notch portions 46. The notch portions 46, whose inner peripheral end edges are U-shaped, are formed in a total of two places in a vehicle vertical direction intermediate portion of the inside flange portion 26A, and the positions of the notch portions 46 in the vehicle vertical direction are aligned with the slit portions 42 in the outside flange portion 26B. The bolts 36A penetrate the notch portions 46.

Figure 2B:
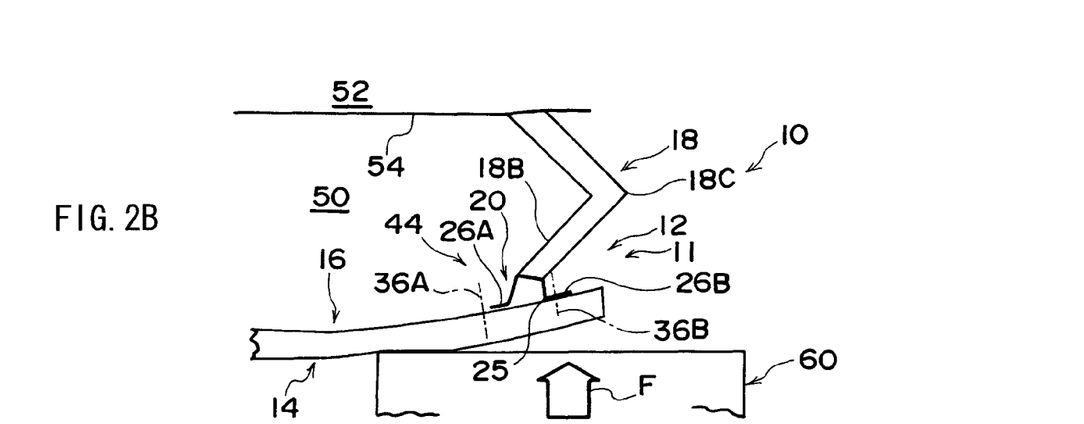
Figure 2C:
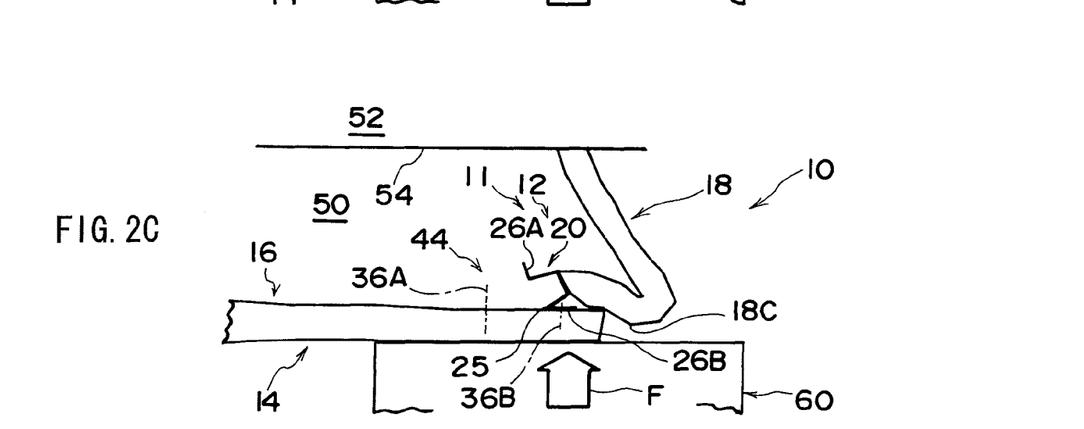

In FIG. 2A, FIG. 2B and FIG. 2C, there is shown a bumper attachment portion 11 attached to the front side member 18 side of the front bumper reinforcement 16. The attachment releasing structure portion 44 is disposed in the bumper attachment portion 11. When a load that is equal to or greater than a predetermined value is inputted to the bumper attachment portion 11 as a result of the impact load F being inputted to the front bumper reinforcement 16 during an impact, the attachment releasing structure portion 44 releases the state of attachment resulting from the bolts 36A at the vehicle width direction inside part of the bumper attachment portion 11. Thus, the attachment releasing structure portion 44 causes a point of origin of bending of the bumper attachment portion 11 to be positioned at the outside flange portion 26B side. That is, the point of origin of bending is provided in the vehicle width direction outside part (a bending portion 25 that is an interconnecting part where the vertical wall portion 24B and the outside flange portion 26B are interconnected) in the bumper attachment portion 11 (see FIG. 2C).

As shown in FIG. 3A, the bumper bracket 20 is disposed with extension portions 28 that are bent in a substantial right angle toward the vehicle front side from the top ends and the bottom ends of the rear end attachment portion 22, the vertical wall portions 24A and 24B and the flange portions 26A and 26B and extend on a top surface 16B side and a bottom surface (not shown) side of the front bumper reinforcement 16. It will be noted that the extension portion 28 that extends on the bottom surface (not shown) side of the front bumper reinforcement 16 (see FIG. 3C) has the same shape as that of the extension portion 28 that extends on the top surface 16B side when seen in a vehicle plan view. The extension portions 28 are spot-welded (or arc-welded) in a state where they surface-contact the top surface 16B and the bottom surface (not shown) of the front bumper reinforcement 16.

As shown in FIG. 1 and FIG. 3A, cutout portion 30 that serves as deformation promotion portion is disposed in the extension portion 28 at a position in the vicinity of origin of the bending portion 25 (their vehicle width direction positions coincide each other). The cutout portion 30 is cut such that distal end portion 30A (apexes where the two diagonal sides of the pentagonal shapes on the opposite side of the bottom side intersect) of the cutout portion 30 is made to substantially coincide in positions in the vehicle width direction with the ridgeline position of the bending portion 25. When a load that is equal to or greater than a predetermined value is inputted to the bumper attachment portion 11 during an impact, the cutout portions 30 causes part 28A of the extension portion 28 that is positioned further inward in the vehicle width direction than the position in the vicinity of the origin of the bending portion 25 to bend toward the vehicle rear side. The vehicle front side of the cutout portion 30 is opened, and the cutout portion 30 is formed in substantially bilaterally symmetrical pentagonal shape when seen in a plan view.

(Action and Effects)

Next, the action and effects of the above-described exemplary embodiment will be described.

As shown in FIG. 2A, which shows one side in the vehicle width direction, both longitudinal direction end portion 16A sides of the front bumper reinforcement 16 are attached to the pair of right and left front side members 18 via the bumper brackets 20. The front side members 18 extend substantially parallel to each other along the vehicle front-rear direction. When the impact load F is inputted to the front bumper reinforcement 16 in the case of an offset impact where a barrier 60 and the front bumper 14 collide each other (a case where the collision takes place at one side position in the vehicle width direction and not along all of the vehicle front side of the front bumper 14; the same is true below), the impact load F is propagated from the front bumper reinforcement 16 side to the front side member 18 side.

Further, the front bumper reinforcement 16 extends substantially along the vehicle width direction while convexly curving toward the vehicle front side, so during an offset impact where the impact load F equal to or greater than a predetermined value is inputted to the front bumper reinforcement 16, the front bumper reinforcement 16 deforms so as to become a straight line whose longitudinal direction is along the vehicle width direction. In accompaniment with this, during the early stage of deformation of the front bumper reinforcement 16, the bumper bracket 20 slides (not shown) somewhat inward in the vehicle width direction. With respect to the front side member 18 that has received the load, a bending moment that bends (laterally bends) the front side member 18 convexly outward in the vehicle width direction is generates. After the bumper bracket 20 has moved somewhat inward in the vehicle width direction, the bumper bracket 20 is deformed by the generation of the bending moment acting on the front side member 18 and, as shown in FIG. 2B, moves (slides) so as to be pulled outward in the vehicle width direction together with a front portion 18B (a portion of the front side member 18 that positions nearer to the bumper bracket 20 than an intermediate bending point 18C) of the front side member 18.

Here, as shown in FIG. 3A, the attachment releasing structure portion 44 of the inside flange portion 26A in the bumper bracket 20 is a structure where the notch portions 46 that open inward in the vehicle width direction are formed in the inside flange portion 26A and where the bolts 36A that configure part of the fastening means penetrate the notch portions 46 accordingly. As shown in FIG. 2B, when the front side member 18 becomes bent outward in the vehicle width direction by the bending moment acting on the front side member 18 when it has received the impact load F and a load that is equal to or greater than a predetermined value is inputted to the bumper attachment portion 11, in accompaniment with this, as shown in FIG. 3B, the bolts 36A stably escape from the open sides of the notch portions 46 in the inside flange portion 26A that has been pulled outward in the vehicle width direction, and the state of attachment of the bumper attachment portion 11 at the inside flange portion 26A is released.

Further, when the bending moment acts on the front side member 18 (see FIG. 2B) and the bumper bracket 20 slides outward in the vehicle width direction, the bolts 3 6B that penetrate the slit portions 42 in the outside flange portion 26B strike the inside edge portions of the slit portions 42 on the vehicle width direction inside as a result of the outside flange portion 26B moving outward in the vehicle width direction, and the bolts 36B deter the sliding of the outside flange portion 26B outward in the vehicle width direction. Thus, as shown in FIG. 3C, the bending portion 25 at the outside flange portion 26B side becomes a point of origin of bending, and the bumper bracket 20 bends. For this reason, as shown in FIG. 2C, when seen in a plan view, the front side member 18 bends while being supported with pin like configuration state where the front side member 18 is fixed at one-point.

Further, when a load that is equal to or greater than a predetermined value is inputted to the bumper attachment portion 11 during an offset impact, in that bumper attachment portion 11, the part 28A of the extension portions 28 shown in FIG. 3C bends toward the vehicle rear side (in the direction of a vehicle cabin) because of the cutout portions 30. That is, when the impact load F is inputted during an offset impact and a load that is equal to or greater than a predetermined value is inputted to the bumper attachment portion 11, the bumper bracket 20 stably bends with a large bending angle using the bending portion 25 at the outside flange portion 26B side as a point of origin of bending.

Thus, the movement locus of the intermediate bending point of the front side member 18 shown in FIG. 2B and FIG. 2C that has become bent outward in the vehicle width direction becomes positioned further outward in the vehicle width direction in comparison to a structure where there is no attachment releasing structure portion 44 and, as shown in FIG. 2C, the intermediate bending point 18C of the front side member 18 is displaced from the side of the front bumper reinforcement 16 to the vehicle front side. That is, the relationship between a distance LA and a distance LB becomes LA<LB, wherein the distance LA is defined as a length from a vehicle width direction center position of the front bumper reinforcement 16 to a vehicle width direction outside end portion position, and the distance LB is defined as a length from a vehicle width direction center position of the front bumper reinforcement 16 to a vehicle width direction position of the intermediate bending point 18C of the front side member 18 after buckling. For this reason, in the structure of the present exemplary embodiment, the deformation stroke of the front side member 18 can be lengthened in comparison to a structure where the intermediate bending point (18C) of the front side member (18) impacts the front bumper reinforcement (16), and it becomes possible to further ensure an energy absorbing amount.

Note that, when the strength of the front bumper reinforcement 16 is increased in order to cope an impact from the front portion, the front bumper reinforcement (16) does not deform that much noted above accordingly, in a structure where the intermediate bending point (18C) impacts the front bumper reinforcement (16), the deformation stroke of the front side member (18) becomes shorter. In contrast, in the present exemplary embodiment, a long deformation stroke of the front side member 18 can be ensured. Further, in a case that the strength of the front bumper reinforcement 16 is increased and the front bumper reinforcement 16 is extended outward in the vehicle width direction in order to coop an impact from the front portion, it becomes susceptible for the intermediate bending point (18C) to impact the front bumper reinforcement (16). In the present exemplary embodiment however, the bending portion 25 at the outside flange portion 26B side is used as a point of origin of bending in a state where the bumper bracket 20 has been shifted outward in the vehicle width direction therefore, it is easy to cause the intermediate bending point 18C to be displaced toward the side of the front bumper reinforcement 16 (elimination of dead stroke is realized).

As described above, according to the bumper attachment portion structure 12 pertaining to the present exemplary embodiment, when the front bumper 14 impacts at a position thereof that is offset in the vehicle width direction of the front bumper 14, the front side member 18, and accordingly the bumper bracket 20, can be bent from the bending portion 25 at the outside flange portion 26B side, and the deformation stroke of the front side member 18 can be ensured. As a result, it becomes possible to reduce the load applied to the dash panel 54 that is provided at the cabin 52 side.

Second Exemplary Embodiment

Figure 4A:
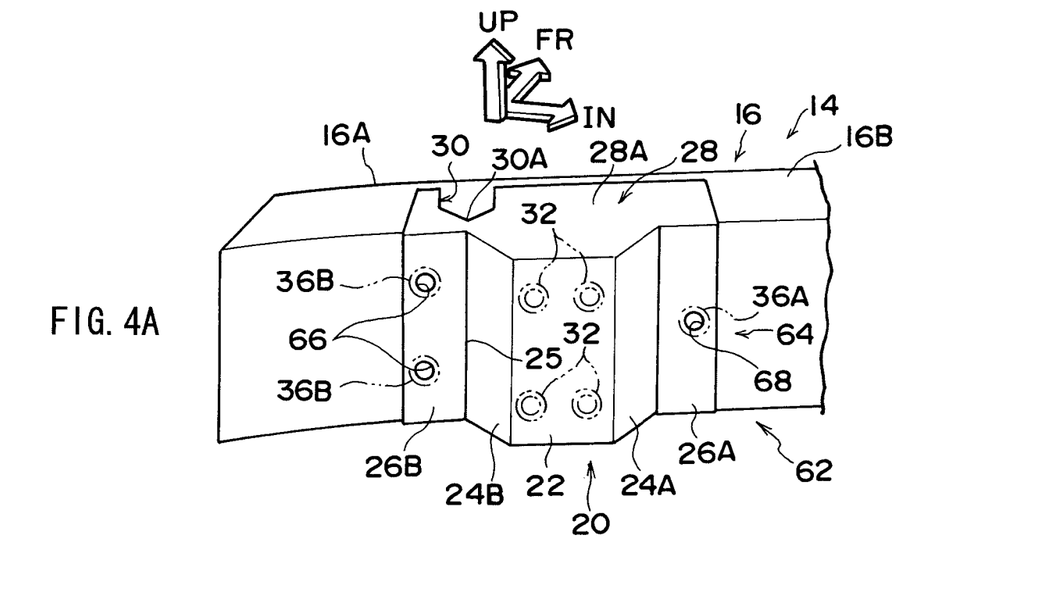
FIG. 4A is a perspective diagram showing relevant portions of a bumper attachment portion structure pertaining to a second exemplary embodiment of the present invention.

Next, bumper attachment portion structures pertaining to a second exemplary embodiment of the present invention and a modification thereof will be described using FIG. 4A and FIG. 4B. In FIG. 4A, there is shown, in a perspective diagram, a bumper attachment portion structure 62 pertaining to the second exemplary embodiment of the present invention. As shown in FIG. 4A, the bumper attachment portion structure 62 is different from the bumper attachment portion structure 12 pertaining to the first exemplary embodiment in that the bumper attachment portion structure 62 is disposed with a low attachment strength structure portion 64 that serves as the attachment releasing part instead of the attachment releasing structure portion 44 (see FIG. 3A, FIG. 3B and FIG. 3C). The other configurations are substantially the same as those of the first exemplary embodiment. Thus, the same reference numerals will be given to configural portions that are substantially the same as those of the first exemplary embodiment and description of those configural portions that are substantially the same will be omitted.

As shown in FIG. 4A, bolt insertion holes 66 are penetratingly formed in a total of two places above and below in the vehicle vertical direction intermediate portion of the outside flange portion 26B. Bolts 36B penetrate the bolt insertion holes 66. A bolt insertion hole 68 is penetratingly formed in one place in the vehicle vertical direction center portion of the inside flange portion 26A, and a bolt 36A penetrates the bolt insertion hole 68. Note that the diameters of the shaft portions of the bolts 36B for causing a fastening load to act on the front bumper reinforcement 16 and the outside flange portion 26B and the diameter of the shaft portion of the bolt 36A for causing a fastening load to act on the front bumper reinforcement 16 and the inside flange portion 26A are the same.

That is, in the bumper attachment portion 11, in the low attachment strength structure portion 64 that is disposed in the inside flange portion 26A, the attachment strength (fastening strength) with which the inside flange portion 26A is attached to the front bumper reinforcement 16 by the bolt 36A and the nut 38A (see FIG. 1) is set to be lower in comparison to the attachment strength (fastening strength) with which the outside flange portion 26B is attached to the front bumper reinforcement 16 by the bolts 36B and the nuts 38B (see FIG. 1). In other word, in the low attachment strength structure portion 64, the number of bolts on the vehicle width direction inside has been reduced.

According to this structure, while the configuration is relatively simple, when a load that is equal to or greater than a predetermined value is inputted to the bumper attachment portion 11 as a result of the impact load F being inputted to the front bumper reinforcement 16 (see FIG. 2A) when the offset collision takes place, the bolt 36A is broken by shearing force resulting from the front bumper reinforcement 16 that occurs between the front bumper reinforcement 16 and the inside flange portion 26A, and the attachment of the inside flange portion 26A is released. Thus, the bending portion 25 at the outside flange portion 26B side becomes a point of origin of bending. That is, the bumper bracket 20 and the front portion of the front side member 18 (see FIG. 1) bend using the bending portion 25 as a point of origin of bending. As described above, according to the bumper attachment portion structure 62 pertaining to the present exemplary embodiment, because the low attachment strength structure portion 64 is disposed, the deformation stroke of the front side member 18 (see FIG. 1) can be ensured when the front bumper 14 impacts at the position which is offset in the vehicle width direction.

Modification of Second Exemplary Embodiment

Figure 4B:
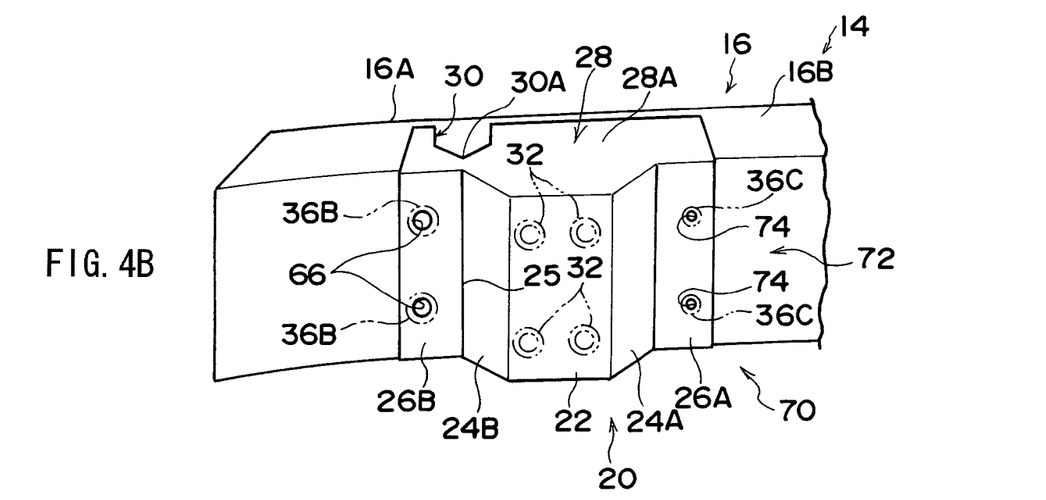
FIG. 4B is a perspective diagram showing a modification of the bumper attachment portion structure pertaining to the second exemplary embodiment.

In FIG. 4B, there is shown a bumper attachment portion structure 70 pertaining to a modification of the present exemplary embodiment. As shown in FIG. 4B, bolt insertion holes 74, whose diameters are smaller in comparison to those of the bolt insertion holes 66 in the outside flange portion 26B, are penetratingly formed in a total of two places above and below (in substantially the same vertical positions as those of the bolt insertion holes 66) in the vehicle vertical direction intermediate portion of the inside flange portion 26A. Bolts 36C which serve as fastening parts penetrate the bolt insertion holes 74. The diameters of the bolt shaft portions of the bolts 36C are smaller in comparison to those of the bolts 36B for the outside flange portion 26B,. The bolts 36C penetrate the inside flange portion 26A and the front bumper reinforcement 16, and nuts (not shown) are screwed onto the distal end portions of the bolts 36C. Thus, the bolts 36C cause a fastening load to act on the front bumper reinforcement 16 and the inside flange portion 26A.

That is, in a low attachment strength structure portion 72 that is disposed in the inside flange portion 26A, the attachment strength (fastening strength) with which the inside flange portion 26A is attached to the front bumper reinforcement 16 by the bolts 36C and the nuts (not shown) is set to be lower in comparison to the attachment strength (fastening strength) with which the outside flange portion 26B is attached to the front bumper reinforcement 16 by the bolts 36B and the nuts 38B (see FIG. 1).

According to this structure, while the configuration is relatively simple, when a load that is equal to or greater than a predetermined value is inputted to the bumper attachment portion 11 as a result of the impact load F being inputted to the front bumper reinforcement 16 (see FIG. 2A) when the offset collision takes place, the bolts 36C are broken by shearing force resulting from the front bumper reinforcement 16 that occurs between the front bumper reinforcement 16 and the inside flange portion 26A, and the attachment of the inside flange portion 26A is released thereby, the bending portion 25 at the outside flange portion 26B side becomes a point of origin of bending. As a result, in the bumper attachment portion structure 70 pertaining to the present modification, substantially the same action and effects as those of the low attachment strength structure portion 64 shown in FIG. 4A are obtained by the low attachment strength structure portion 72.

It will be noted that, in the bumper attachment portion structure 62 pertaining to the second exemplary embodiment and the bumper attachment portion structure 70 pertaining to the modification thereof, the inside flange portion 26A is fastened to the front bumper reinforcement 16 by the bolt 36A or the bolts 36C and the like, but these bumper attachment portion structures may also be configured such that, for example, the inside flange portion 26A is not fastened by fastening parts.

Third Exemplary Embodiment

Figure 5A:
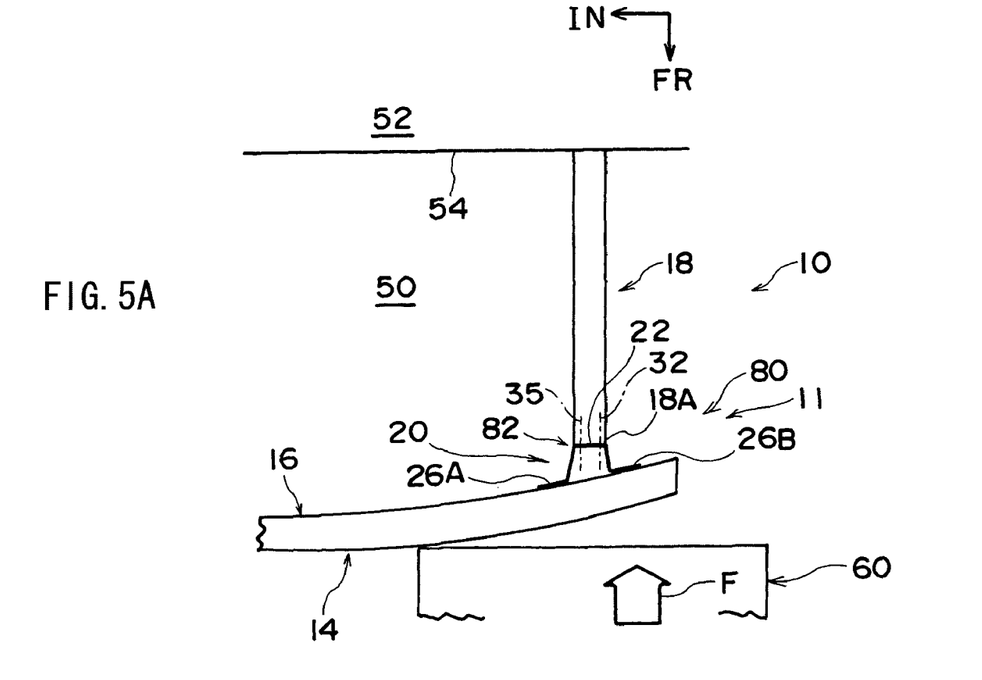
FIG. 5A and FIG. 5B are state change diagrams schematically showing deformation at a vehicle body front portion during an offset collision in a bumper attachment portion structure pertaining to a third exemplary embodiment of the present invention.
Figure 5B:
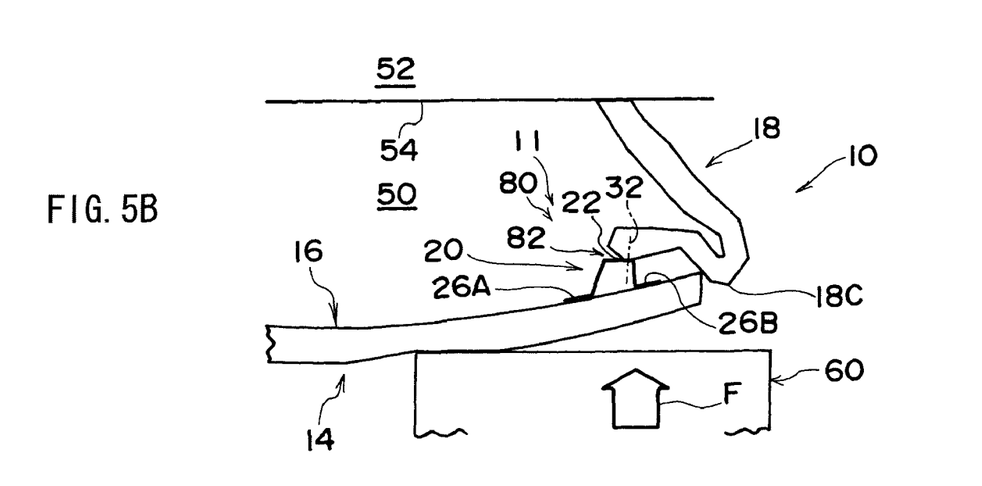

A bumper attachment portion structure pertaining to a third exemplary embodiment of the present invention will be described using FIG. 5A to FIG. 6. In FIG. 5A and FIG. 5B, a bumper attachment portion structure 80 pertaining to the third exemplary embodiment is shown in diagrams indicating deformation state, and in FIG. 6, relevant portions of the bumper attachment portion structure 80 are shown in a perspective diagram. As shown in these diagrams, in the bumper attachment portion structure 80, when a load that is equal to or greater than a predetermined value is inputted to the bumper attachment portion 11 as a result of the impact load F being inputted to the front bumper reinforcement 16 when the offset collision takes place, the attachment between the rear end attachment portion 22 of the bumper bracket 20 and the front side member 18 is released at the vehicle width direction inside part. In this regard, the bumper attachment portion structure 80 is different from the bumper attachment portion structures 12 and 62 (see FIG. 1 to FIG. 4B) pertaining to the first and second exemplary embodiments. In the present exemplary embodiments, the attachment between the inside flange portion 26A and the front bumper reinforcement 16 is not released. The other configurations are substantially the same as those of the first and second exemplary embodiments. Thus, the same reference numerals will be given to configural portions that are substantially the same as those of the first and second exemplary embodiments and description of those configural portions that are substantially the same will be omitted.

Figure 6:
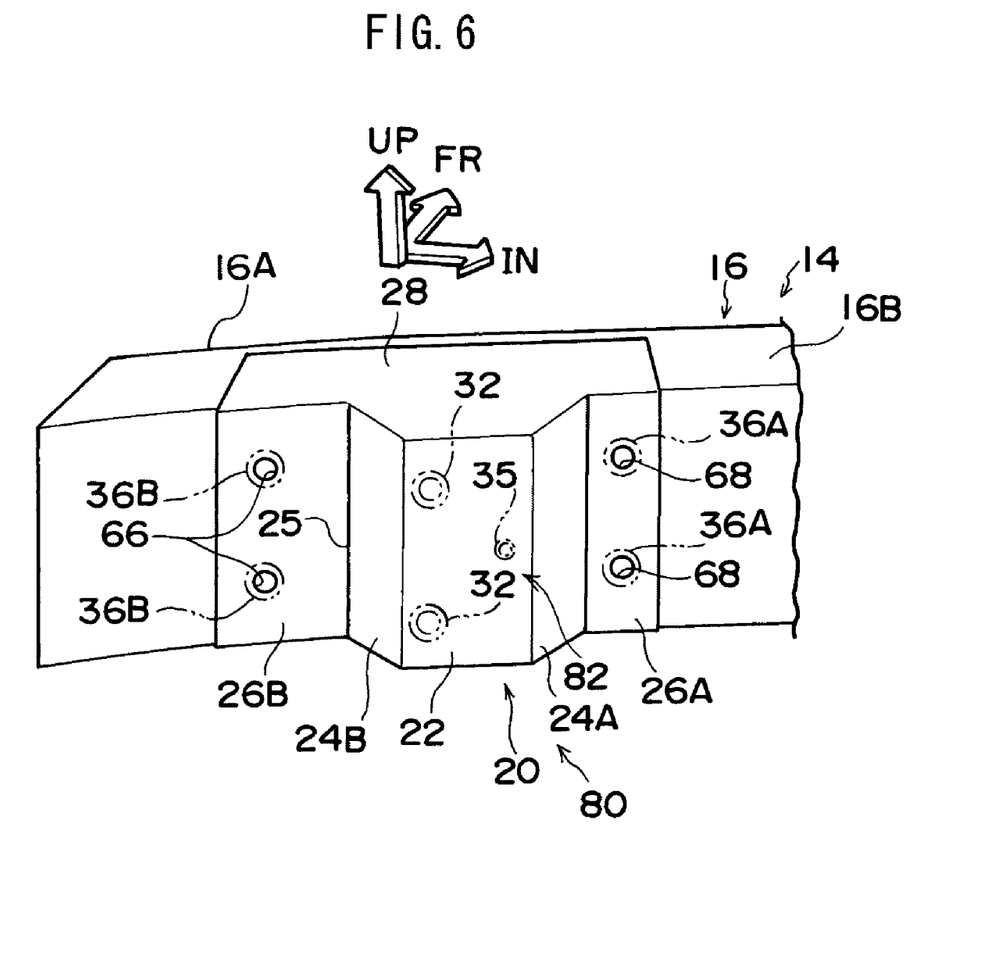
FIG. 6 is a perspective diagram showing relevant portions of the bumper attachment portion structure pertaining to the third exemplary embodiment of the present invention.

As shown in FIG. 6, bolt insertion holes 68, which have the same diameters as bolt insertion holes 66 in the outside flange portion 26B, are penetratingly formed in a total of two places above and below (in the same vertical positions as those of the bolt insertion holes 66) in the vehicle vertical direction intermediate portion of the inside flange portion 26A of the bumper bracket 20. Bolts 36A penetrate the bolt insertion holes 68. The bolts 36A penetrate the inside flange portion 26A and the front bumper reinforcement 16, and nuts (not shown) are screwed onto the distal end portions of the bolts 36A. Thus, the bolts 36A cause a fastening load to act on the front bumper reinforcement 16 and the inside flange portion 26A.

The vehicle width direction outside part of the rear end attachment portion 22 of the bumper bracket 20 is fixed to the front end portion 18A of the front side member 18 (see FIG. 5A). The rear end attachment portion 22 is fixed in its upper and lower portions in the vehicle vertical direction to the front end portion 18A in a total of two places by bolts 32 and nuts (not shown). Further, a bolt 35, whose diameter is smaller than that of the bolt shaft portions of the bolts 32, penetrates the vehicle vertical direction center portion of the vehicle width direction inside part of the rear end attachment portion 22. The bolt 35 penetrates the rear end attachment portion 22 and the front end portion 18A of the front side member 18 (see FIG. 5A), and a nut (not shown) is screwed onto the distal end portion of the bolt 35, whereby the vehicle width direction inside part of the rear end attachment portion 22 is fixed in one place to the front end portion 18A of the front side member 18 (see FIG. 5A). Thus, the bolt fastening points (joined portions) between the rear end attachment portion 22 and the front end portion 18A become more concentrated on the vehicle width direction outside (the portion where the fastening points are concentrated becomes offset toward the vehicle width direction outside).

That is, a low attachment strength portion 82 that serves as the attachment releasing part is disposed on the vehicle width direction inside part of the bumper attachment portion 11 (attachment portion between the rear end attachment portion 22 of the bumper bracket 20 and the front end portion 18A of the front side member 18). In the bumper attachment portion 11, the low attachment strength portion 82 causes the point of origin of bending of the bumper attachment portion 11 to be positioned in the vehicle width direction outside part (the part fastened by the bolts 32) when the attachment at the vehicle width direction inside part (the part fastened by the bolt 35) is released when a load that is equal to or greater than a predetermined value is inputted to the bumper attachment portion 11 as a result of the impact load F being inputted to the front bumper reinforcement 16 during an offset impact.

According to the bumper attachment portion structure 80 pertaining to the present exemplary embodiment, when the impact load F is inputted to the front bumper reinforcement 16 when the offset collision takes place, the front side member 18 is bent outward in the vehicle width direction by the bending moment acting on the front side member 18, and a load that is equal to or greater than a predetermined value is inputted to the bumper attachment portion 11. In accompaniment with this, in that bumper attachment portion 11, the bolt 35 of the low attachment strength portion 82 breaks, the attachment at the vehicle width direction inside part (the part fastened by the bolt 35) of the bumper attachment portion 11 is released and, as shown in FIG. 5B, the vehicle width direction outside part (the part fastened by the bolts 32) of the bumper attachment portion 11 becomes a point of origin of bending and bends. Thus, the movement locus of the intermediate bending point 18C of the front side member 18 that has become bent outward in the vehicle width direction becomes provided further outward in the vehicle width direction in comparison to a structure where there is no low attachment strength portion 82. That is, the intermediate bending point 18C of the front side member 18 advances as far as the side of the front bumper reinforcement 16. For this reason, the deformation stroke of the front side member 18 can be ensured when the front bumper 14 impacts at the position which is offset in the vehicle width direction.

It will be noted that, in the third exemplary embodiment, as shown in FIG. 5A and FIG. 6, the vehicle width direction inside part of the rear end attachment portion 22 is fixed in one place to the front end portion 18A of the front side member 18, but it may also be configured such that the vehicle width direction inside part of the rear end attachment portion 22 is not fixed to the front end portion 18A of the front side member 18.

It will be noted that the bumper attachment portion structures 12, 62, 70 and 80 pertaining to each of the preceding exemplary embodiments are applied to the vehicle body front portion structure 10 where the bumper brackets 20 are intervened between the front end portions 18A of the front side members 18 and the front bumper reinforcement 16 and couple together those front end portions 18A and the front bumper reinforcement 16, but the bumper attachment portion structures may also be applied to other vehicle body structures, such as, for example, a vehicle body structure where both longitudinal direction end portions of the bumper reinforcement are directly attached to the side members or a vehicle body structure where dash boxes are intervened between end portions of the side members on the bumper reinforcement side and the bumper reinforcement and where those dash boxes couple together those end portions of the side members and the bumper reinforcement.

Further, when the bumper reinforcement is directly attached to the side members, flange-like attachment portions that extend outward and inward in the vehicle width direction may be formed on the end portions of the side members on the bumper reinforcement side for attachment to the bumper reinforcement, for example, and these attachment portions and the bumper reinforcement are attached by the similar structure of the attachment portions between the flange portions 26A and 26B and the front side members 18 in the first and second exemplary embodiments and the modification of the second exemplary embodiment to thereby configure the attachment releasing part.

Further, the bumper attachment portion structure may also be configured so as to be disposed with both the attachment portions between the flange portions 26A and 26B and the front bumper reinforcement 16 in the first and second exemplary embodiments and the modification of the second exemplary embodiment; and the attachment portions between the bumper brackets 20 and the front side members 18 in the third exemplary embodiment.

Further, in the preceding exemplary embodiments, the fastening part that cause a fastening load to act on the front bumper reinforcement 18 and the flange portions 26A and 26B are configured by the bolts 36A, 36B and 36C and the nuts 38A and 38B, but the fastening part may also be configured by other fastening means such as rivets or the like, for example.

Moreover, in the preceding first exemplary embodiment, as shown in FIG. 3A, FIG. 3B and FIG. 3C, the slit portions 42 for allowing the bolts 36B to penetrate are formed in the outside flange portion 26B of the bumper bracket 20, but instead of the slit portions 42, elongate holes that extend along the longitudinal direction of the bumper reinforcement and allow bolts to penetrate may also be formed in the outside flange portion.

Moreover, the bumper attachment portion structures 12, 62, 70 and 80 pertaining to the preceding exemplary embodiments are applied to the vehicle body front portion structure 10 where the bumper reinforcement is configured by the front bumper reinforcement 16 and where the side members are configured by the front side members 18, but the bumper attachment portion structures may also be applied to a vehicle body rear portion structure where the bumper reinforcement is configured by a rear bumper reinforcement and where the side members are configured by rear side members, for example.

It will be noted that, in the preceding exemplary embodiments, the bumper brackets 20 are disposed with the extension portions 28 that extend on the top surface 16B side and the bottom surface (not shown) side of the front bumper reinforcement 16, but the extension portions of the bumper brackets may also extend on only the top surface side or on the bottom surface side of the bumper reinforcement. Further, the cutout portion 30 that serves as deformation promoting portions is formed in the extension portions 28, but the deformation promoting portions may also be configured by other deformation promoting portions such as through holes or the like, for example. The other deformation promoting portions are also disposed in the extension portions at positions in the vicinities of the origins where their vehicle width direction positions coincide with the parts of the outside flange portions that become the point of origin of bending. When a load that is equal to or greater than a predetermined value is inputted to the bumper attachment portion during an impact, the other deformation promoting portions also cause the parts of the extension portions of the bumper attachment portion positioned further inward in the vehicle width direction than the positions in the vicinities of the origins to bend inward in the vehicle width direction.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A bumper attachment portion structure that is applied to a vehicle body structure, comprising a bumper reinforcement, a pair of right and left side members, and attachment releasing parts, wherein:

the bumper reinforcement is disposed on an end portion side in a front-rear direction of a vehicle, extends substantially along a vehicle width direction while convexly curving frontward or rearward in the vehicle front-rear direction, and receives an impact load during an impact;

the pair of right and left side members extend substantially parallel to each other along the vehicle front-rear direction and have attached thereto, directly or via other members, both longitudinal direction end portion sides of the bumper reinforcement; and each of the attachment releasing parts is disposed at a bumper attachment portion where the bumper reinforcement and the side member are connected to each other, and when a load that is equal to or greater than a predetermined value is inputted to the bumper attachment portion during an impact, the attachment releasing part releases the state of attachment at a vehicle width direction inside part of the bumper attachment portion to thereby cause a point of origin of bending in the bumper attachment portion to be positioned in a vehicle width direction outside part of the bumper attachment portion and the attachment releasing part maintains release of the attachment at the vehicle width direction inside part of the bumper attachment portion.

2. The bumper attachment portion structure of claim 1, further comprising bumper brackets wherein:

the bumper brackets are respectively provided in the bumper attachment portions between an end portion of the side member on the bumper reinforcement side and the bumper reinforcement and couple the end portions of the side members and the bumper reinforcement together, each of the bumper brackets is provided with an inside flange portion and an outside flange portion that extend further inward and outward respectively in the vehicle width direction than an attachment position where the bumper bracket is attached to the side member, and is attached to the bumper reinforcement by the inside and outside flange portions, and each of the attachment releasing parts is disposed at the inside flange portion and, when a load that is equal to or greater than a predetermined value is inputted to the bumper attachment portion during the impact, uses an outside flange portion side of the bumper attachment portion as a point of origin of bending.

3. The bumper attachment portion structure of claim 2, further comprising fastening parts that cause fastening load to act on the bumper reinforcement and the inside and outside flange portions, wherein each of the attachment releasing parts configures an attachment releasing structure portion where a slot portion that opens inward in the vehicle width direction is formed in the inside flange portion, and a portion of the fastening part penetrates the slot portion.

4. The bumper attachment portion structure of claim 2, further comprising fastening parts that cause fastening load to act on the bumper reinforcement and the inside and outside flange portions, wherein each of the attachment releasing parts includes a low attachment strength structure portion where the attachment strength with which the inside flange portion is attached to the bumper reinforcement by the fastening part is set to be lower in comparison to the attachment strength with which the outside flange portion is attached to the bumper reinforcement.

5. The bumper attachment portion structure of claim 2, wherein:

each of the bumper brackets is provided with an extension portion that extends on at least one side of a top surface side or a bottom surface side of the bumper reinforcement, and a deformation promoting portion is formed in the extension portion in a vicinity position of the point of origin of bending, the vicinity position coincides in the vehicle width direction with the part of the outside flange portion side that becomes the point of origin of bending, and when a load that is equal to or greater than a predetermined value is inputted to the bumper attachment portions during the impact, the deformation promoting portion causes a part of the bumper attachment portions that is positioned further inward in the vehicle width direction than the vicinity position of the point of origin of bending to bend frontward or rearward in a direction of a vehicle cabin in the vehicle front-rear direction.

6. The bumper attachment portion structure of claim 1, further comprising bumper brackets that are respectively provided between an end portion of the side member on the bumper reinforcement side and the bumper reinforcement and couple together the end portions of the side members and the bumper reinforcement, wherein each of the attachment releasing parts is disposed in the side member and the bumper bracket and, when a load that is equal to or greater than a predetermined value is inputted to the bumper attachment portions during the impact, uses vehicle width direction outside parts of the side member and the bumper bracket as points of origin of bending.

7. The bumper attachment portion structure of claim 6, further comprising fastening parts that cause a fastening load to act on the side members and the bumper brackets, wherein each of the attachment releasing parts configures a low attachment strength portion where the attachment strength resulting from the fastening part with respect to the side members and the bumper brackets is set to be lower in a vehicle width direction inside part than in a vehicle width direction outside part.

* * * * *